UNITED STATES PATENT OFFICE.

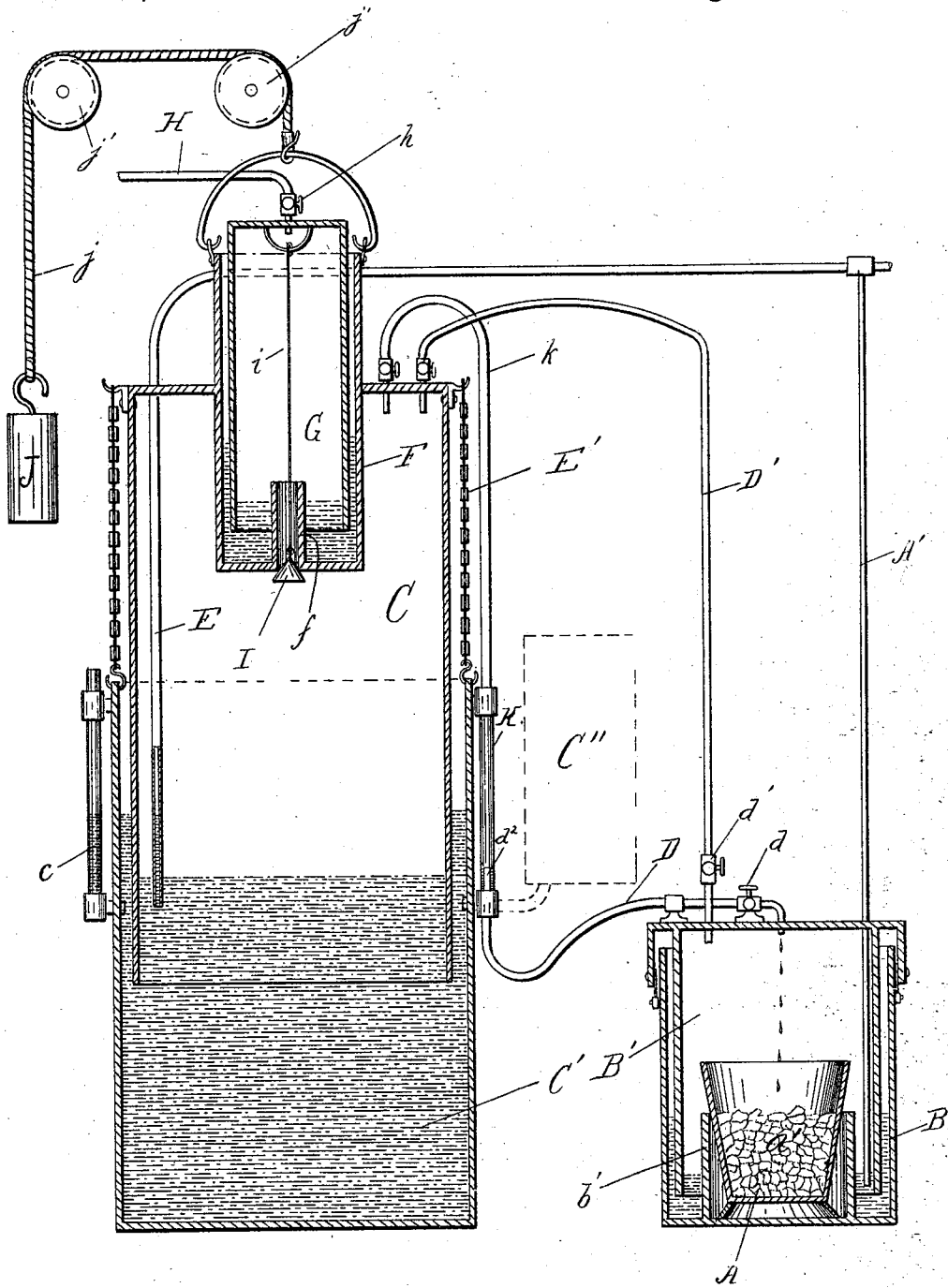

DAVID CHARLES MORENCY, OF LEVIS, CANADA.

APPARATUS FOR GENERATING ACETYLENE GAS.

SPECIFICATION forming part of Letters Patent No. 588,593, dated August 24, 1897.

Application filed March 29, 1897. Serial No. 629,714. (No model.) Patented in Canada February 10, 1897, No. 54,942.

*To all whom it may concern:*

Be it known that I, DAVID CHARLES MORENCY, a citizen of the Dominion of Canada, residing at Levis, in the county of Levis, Province of Quebec, Canada, have invented certain new and useful Improvements in Apparatus for Generating Acetylene Gas, (for which I have obtained Canadian patent, No. 54,942, dated February 10, 1897;) and I do hereby declare the following to be a full, clear, and exact description of the invention, such as will enable others skilled in the art to which it appertains to make and use the same.

This invention relates to apparatus for supplying acetylene gas; and it consists in the novel construction and combination of the parts hereinafter fully described and claimed.

The drawing shows a sectional side view of the apparatus.

A is a vessel for containing a metallic carbid $a'$, such as the carbid of calcium, from which acetylene gas is formed by the addition of water according to the well-known reaction.

B is an outer vessel for holding water, and B' is a gas vessel open at the bottom and arranged over the vessel A, inside the vessel B. The water in the vessel B keeps the vessel B' gas-tight. An inner wall $b'$ in the vessel B keeps the water from coming in contact with the vessel containing the carbid. A solution of chlorid of calcium or of chlorid of sodium may be used instead of water, if desired, with the advantage of not freezing so easily and of absorbing ammoniacal gas. Other viscous liquid may also be used when necessary.

D is a flexible tube provided with a valve $d$ for dropping water onto the carbid of calcium.

D' is an outlet-pipe for the gas, provided with a valve $d'$ and connected to the gas vessel B'.

A' is an escape-pipe for the gas, should it accumulate in the vessel B'. The pipe A' extends downward through the vessel B' into the water. When the pressure in the vessel B' becomes so great that the water in it is depressed below the bottom of the pipe A', the gas escapes up the said pipe and outside the building.

C is the gas-receiver, consisting of a vessel open at the bottom and slidable vertically in a vessel C', which contains water with chlorid of sodium or chlorid of calcium or any other liquid, such as oil or molasses. The pipe D' is connected to the top part of the gas-receiver. The height of the liquid in the vessel C' is indicated by the transparent tube or glass gage $c$. The lower part of this tube is connected to the vessel C' and its upper part is open to the atmosphere.

K is a transparent tube or glass gage secured to the vessel C', and $k$ is a flexible pipe connecting the upper part of the tube K with the upper part of the gas-receiver C. The flexible water-pipe D has a nozzle $d^2$, which projects upwardly within the tube K. The liquid in the tube K always stands at the same height as the liquid in the gas-receiver C, because the pipe $k$ is connected to the gas-space of the said receiver.

E is an escape-pipe for the gas in the vessel C, should the pressure become excessive. This pipe extends downward through the said vessel into the water in the vessel C'.

E' are check-chains connecting the vessel C with the vessel C', so that the vessel C cannot be raised by the gas above a certain height.

F is an outer vessel having no top and secured to the top portion of the gas-receiver C. A tube $f$ projects upwardly from the bottom of the vessel F.

G is a vessel which has no bottom and which is slidable in the vessel F.

The vessel F contains water or other liquid, so that the vessel G is gas-tight.

H is the gas-distributing pipe, provided with a valve $h$ and connected to the upper part of the vessel G.

I is a conical plug-valve suspended from the top of the vessel G by a rod or cord $i$ and operating to close the tube $f$ when the vessel G is raised.

J is a counterbalance-weight connected to a flexible connection $j$. This connection passes over pulleys $j'$ and is attached to the vessel F, so that the weight of the vessels F, G, and C is balanced.

Instead of water the vessel C' may contain some other liquid—such as oil, molasses, &c.—so as to be safer when used on cars, steamboats, or other vehicles, and in that case I provide an additional water vessel C″, (shown by dotted lines on the drawing,) and the lower end of the tube K is connected to the vessel C″ instead of being connected to the vessel C′.

The water passes from the vessel C′ or from the vessel C″ down the nozzle $d'$ and pipe D to the carbid, and the gas is generated in the vessel B′. The gas passes from the vessel B′ into the receiver C, through the valve I, and into the vessel G. When the gas enters the vessel G faster than it passes off by the pipe H, the vessel G is raised by the pressure of the gas accumulating inside it, and the valve I is closed. The valve I adjusts itself automatically, so that it lets the gas pass out of the pipe H at a constant prearranged pressure.

When the pressure of the gas increases in the vessel C, it depresses the water in it and in the tube K, and as soon as the level of the water is below the top of the nozzle $d^2$ the supply of water to the carbid is cut off automatically, so that no more gas is formed.

The supply of carbid is renewed as often as necessary, and two similar gas-generators are preferably used and are connected to the gas-receiver alternately, so as to produce a constant supply of gas.

What I claim is—

1. The combination, with an outer vessel for holding liquid, of an inner vessel for holding gas open at its bottom and floating in the said liquid, a tube having its upper end connected to the gas-space of the inner vessel and its lower end connected to the water-space of the outer vessel, and a liquid-supply pipe provided with a nozzle projecting upwardly in the said tube, the flow of liquid through the said nozzle and tube being regulated automatically by the pressure of the gas in the said inner vessel, substantially as set forth.

2. The combination, with an outer vessel for holding liquid, of an inner and slidable vessel for holding gas, a tube having its lower end connected to the water-space of the outer vessel, a flexible pipe connecting the upper part of the said tube with the gas-space of the inner vessel, and a liquid-supply pipe provided with a nozzle projecting upwardly in the said tube, substantially as set forth.

In testimony whereof I affix my signature in presence of two witnesses.

DAVID CHARLES MORENCY.

Witnesses:
ARTHUR GOSSELIN,
J. A. MARION.